United States Patent
Zhang et al.

(10) Patent No.: US 9,053,013 B2
(45) Date of Patent: Jun. 9, 2015

(54) DATA STORAGE DEVICE AND OPERATING METHOD THEREOF

(71) Applicant: VIA TECHNOLOGIES, INC., New Taipei (TW)

(72) Inventors: Bo Zhang, Beijing (CN); Chen Xiu, Beijing (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 165 days.

(21) Appl. No.: 13/908,736

(22) Filed: Jun. 3, 2013

(65) Prior Publication Data

US 2014/0025864 A1    Jan. 23, 2014

(30) Foreign Application Priority Data

Jul. 17, 2012    (CN) .......................... 2012 1 0247902

(51) Int. Cl.
*G06F 12/02* (2006.01)
*G06F 12/08* (2006.01)

(52) U.S. Cl.
CPC ........ *G06F 12/0246* (2013.01); *G06F 12/0802* (2013.01); *G06F 2212/7202* (2013.01); *G06F 2212/7203* (2013.01)

(58) Field of Classification Search
CPC . G06F 12/0246; G06F 12/0802; G06F 12/12; G06F 2212/7202; G06F 2212/7203
See application file for complete search history.

(56) References Cited

U.S. PATENT DOCUMENTS

| 8,725,927 | B2 | 5/2014 | Manning | |
|---|---|---|---|---|
| 8,898,423 | B1* | 11/2014 | Guda et al. | 711/202 |
| 2007/0283081 | A1* | 12/2007 | Lasser | 711/103 |
| 2008/0114930 | A1* | 5/2008 | Sanvido et al. | 711/113 |
| 2013/0042070 | A1* | 2/2013 | Jalal et al. | 711/130 |

FOREIGN PATENT DOCUMENTS

| CN | 101859278 | 10/2010 |
|---|---|---|
| CN | 101957797 | 1/2011 |
| CN | 102012851 | 4/2011 |
| TW | 200937195 A | 9/2009 |
| TW | 201022936 A1 | 6/2010 |
| TW | 201040717 A1 | 11/2010 |

OTHER PUBLICATIONS

English language translation of abstract of CN 101859278 (published Oct. 13, 2010).
English language translation of abstract of CN 101957797 (published Jan. 26, 2011).

(Continued)

*Primary Examiner* — Michael Krofcheck
(74) *Attorney, Agent, or Firm* — McClure, Qualey & Rodack, LLP

(57) ABSTRACT

A data storage device with a FLASH memory and an operating method for the data storage device are disclosed. According to the disclosure, the space of the FLASH memory is allocated to include groups of data blocks, a plurality of shared cache blocks (SCBs) and a plurality of dedicated cache blocks (DCBs). Each SCB is shared by one group of data blocks, for the write data storage when any data block of the group of data blocks is exhausted. The DCBs are allocated for the hot data storage. Each DCB corresponds to one hot logical block.

20 Claims, 9 Drawing Sheets

(56) References Cited

OTHER PUBLICATIONS

English language translation of abstract of CN 102012851 (published Apr. 13, 2011).

Full English machine translation of TW201040717 (Published Nov. 16, 2010).
Full English machine translation of TW200937195 (Published Sep. 11, 2009).

* cited by examiner

| DCB_MT | Logical Page Number corresponding to Page 1 | Logical Page Number corresponding to Page 2 | ... |

FIG. 3C

| SCB_MT | Logical Page Number corresponding to Page 1 | Logical Page Number corresponding to Page 2 | ... |

FIG. 3B

DATA STORAGE DEVICE AND OPERATING METHOD THEREOF

CROSS REFERENCE TO RELATED APPLICATIONS

This application claims priority of China Patent Application No. 201210247902.6, filed on Jul. 17, 2012, the entirety of which is incorporated by reference herein.

BACKGROUND OF THE INVENTION

1. Field of the Invention

The present invention relates to a data storage device with a FLASH memory and an operating method thereof.

2. Description of the Related Art

Today, FLASH memory (e.g., NAND FLASH) is widely used in data storage devices as a storage medium.

FIG. 1A depicts the storage space of a FLASH memory. The FLASH memory 100 may comprise a plurality of physical blocks BLK1, BLK2, and so forth. Each physical block includes a plurality of physical pages. For example, the physical block BLK1 includes physical pages Page1, Page2, and so forth.

According to operating characteristics of a FLASH memory, an erase operation is required to release the space of the FLASH memory. An erase operation has to be performed on an entire block. FIG. 1B depicts the data update for a particular logical address. In the physical block BLK, the old data in space Data_Old becomes invalid when the update data is stored in a spare space Data_New. Because the reuse of the space Data_Old requires an erase operation to be performed on the entire physical block BLK, a valid data collection operation (as known as garbage collection) has to be performed on the physical block BLK prior to the erase operation. After collecting all valid data within the physical block BLK (e.g. data in Data_New) to other physical blocks, the physical block BLK is erasable to be released as a free block.

There are several modes to allocate the storage space of the FLASH memory 100. Typically, the FLASH memory 100 may be allocated according to a block mapping mode or a page mapping mode. FIG. 1C shows that according to a block mapping mode, a physical block (as that defined in FIG. 1A) is allocated to map to a series of consecutive logical addresses at the host for data storage. The series of consecutive logical addresses may form a logical block, which is numbed by "LBN," a logical block number. In the block mapping mode, the data indicated by the series of consecutive logical addresses is written into the physical block page by page in the order of the logical addresses (i.e. sequential in the logical address). Thus, when looking up for a physical space corresponding to a logical address, a block mapping table may be referred to first to find the physical block corresponding to the logical block number (LBN) of the logical address, and then the physical page for the logical address is found from the physical block according to a page offset of the logical address. Note that according to the block mapping mode, data is written into a physical block in sequential according to logical addresses. The valid data collection operation, therefore, is frequently performed and results in a considerable burden on the operation efficiency of the FLASH memory. As for the page mapping mode, the sequential write based on the logical addresses is not necessary and each physical block does not particularly correspond to a series of consecutive logical addresses. However, an enormous page mapping table is required to look up to find the physical page for each logical address, wherein the mapping relation of each logical address to each corresponding physical address needs storing in the page mapping table. The resource consumption is still considerable due to huge storage space for the large-sized mapping table as well as the wide search over the mapping table. How to improve the operation efficiency of a FLASH memory without the aforementioned defects of the block mapping and the page mapping modes is an important issue in the field.

BRIEF SUMMARY OF THE INVENTION

A data storage device with a FLASH memory and an operating method of the data storage device is disclosed.

A data storage device in accordance with an exemplary embodiment of the invention comprises a FLASH memory and a controller. The FLASH memory comprises a plurality of groups of data blocks, a plurality of shared cache blocks (SCBs) and a plurality of dedicated cache blocks (DCBs). Each shared cache block corresponds to a group of data blocks and is shared by the data blocks of the group. Each dedicated cache block corresponds to one hot logical block. The controller is coupled to the FLASH memory. When a logical address of write data is determined to be belonging to a hot logical block, the controller caches the write data into the dedicated cache block corresponding to the hot logical block. When any data block is filled up, the write data requested to be written into the data block is cached into the shared cache block shared by the group of data blocks having the filled-up data block.

In another exemplary embodiment, an operating method for a data storage device is disclosed, which comprises the following steps: allocating a plurality of groups of data blocks, a plurality of shared cache blocks (SCBs) and a plurality of dedicated cache blocks (DCBs) in a FLASH memory of the data storage device, wherein each shared cache block is shared by the data blocks of the same group, and each dedicated cache block corresponds to a hot logical block; when a logical address of write data is determined to be belonging to a hot logical block, the write data is cached into the dedicated cache block corresponding to the hot logical block, and when the logical address is not belonging to a hot logical block and data block corresponding to the logical address is filled up, the write data is cached into the shared cache block shared by the group of data blocks having the filled-up data block.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3B shows a mapping table SCB_MT;

FIG. 3C shows a mapping table DCB_MT;

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1A:
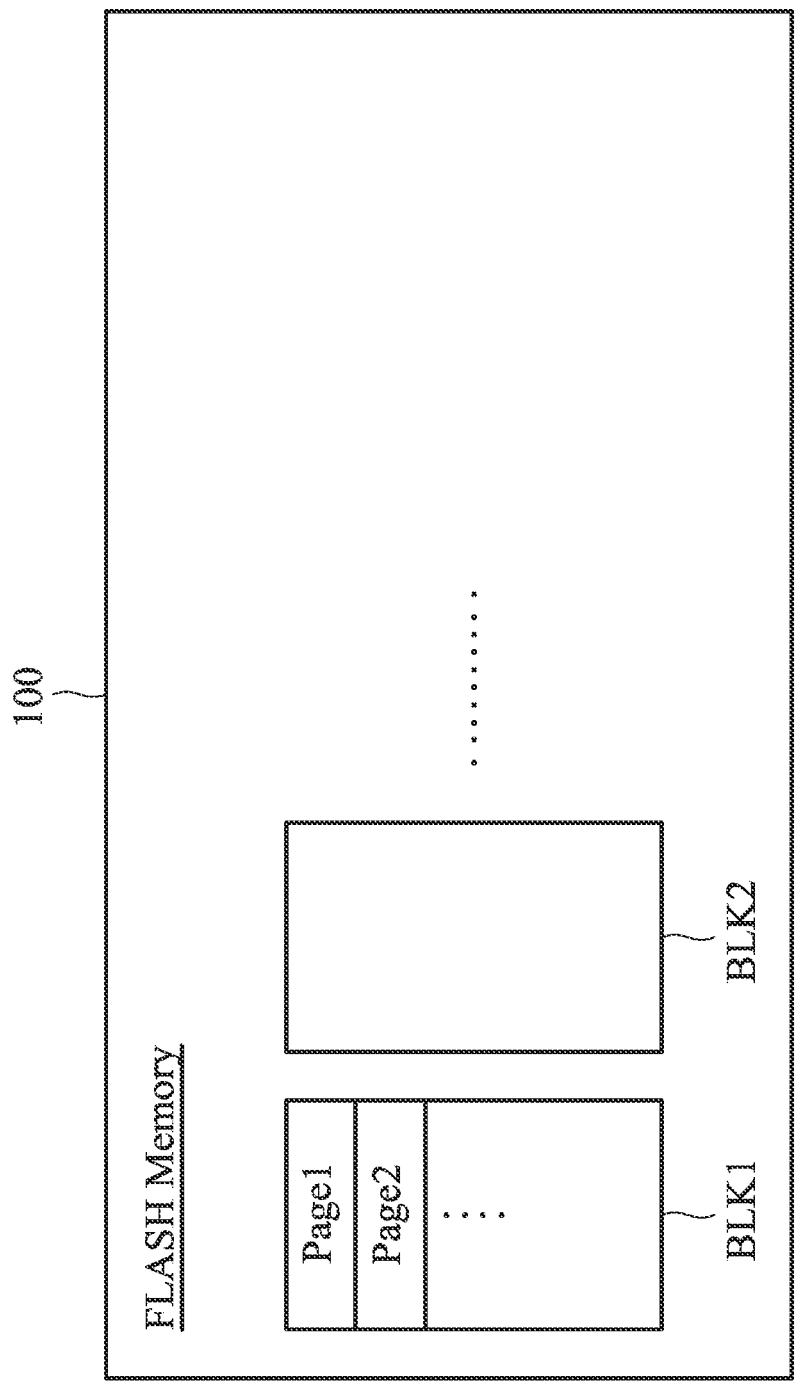
FIG. 1A shows a storage space provided by a FLASH memory.
Figures 1B, 1C:
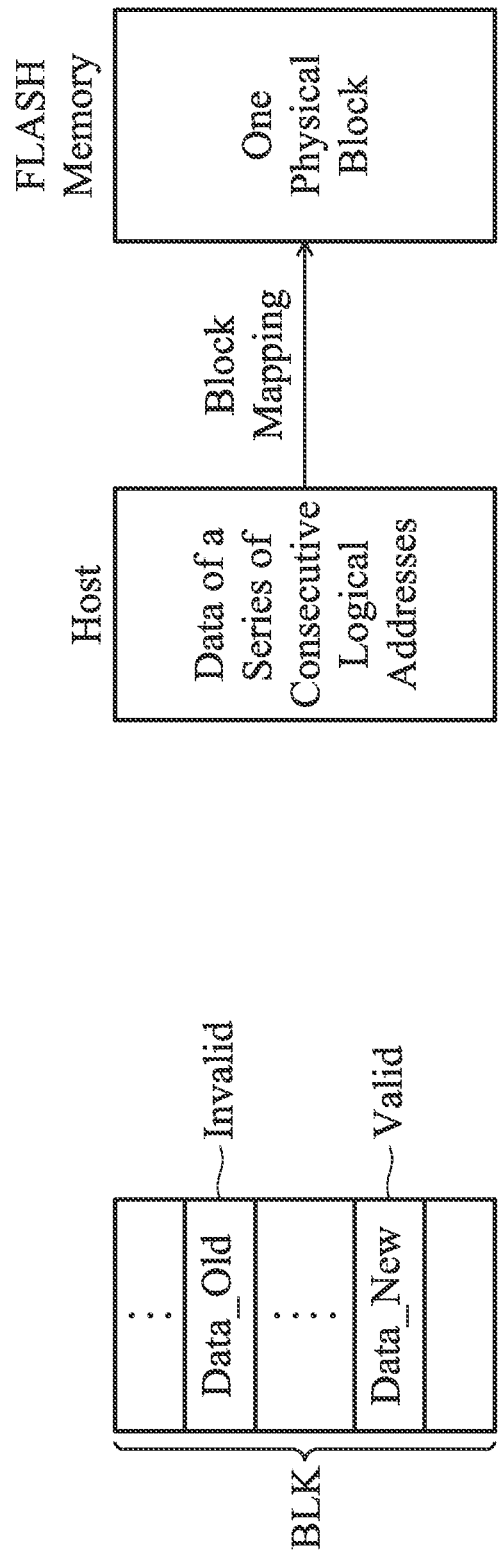
FIG. 1B shows the data update of a particular logical address.
FIG. 1C shows that, according to a block mapping mode, a physical block is allocated to map to a series of consecutive logical addresses of the host for data storage.
Figure 2:
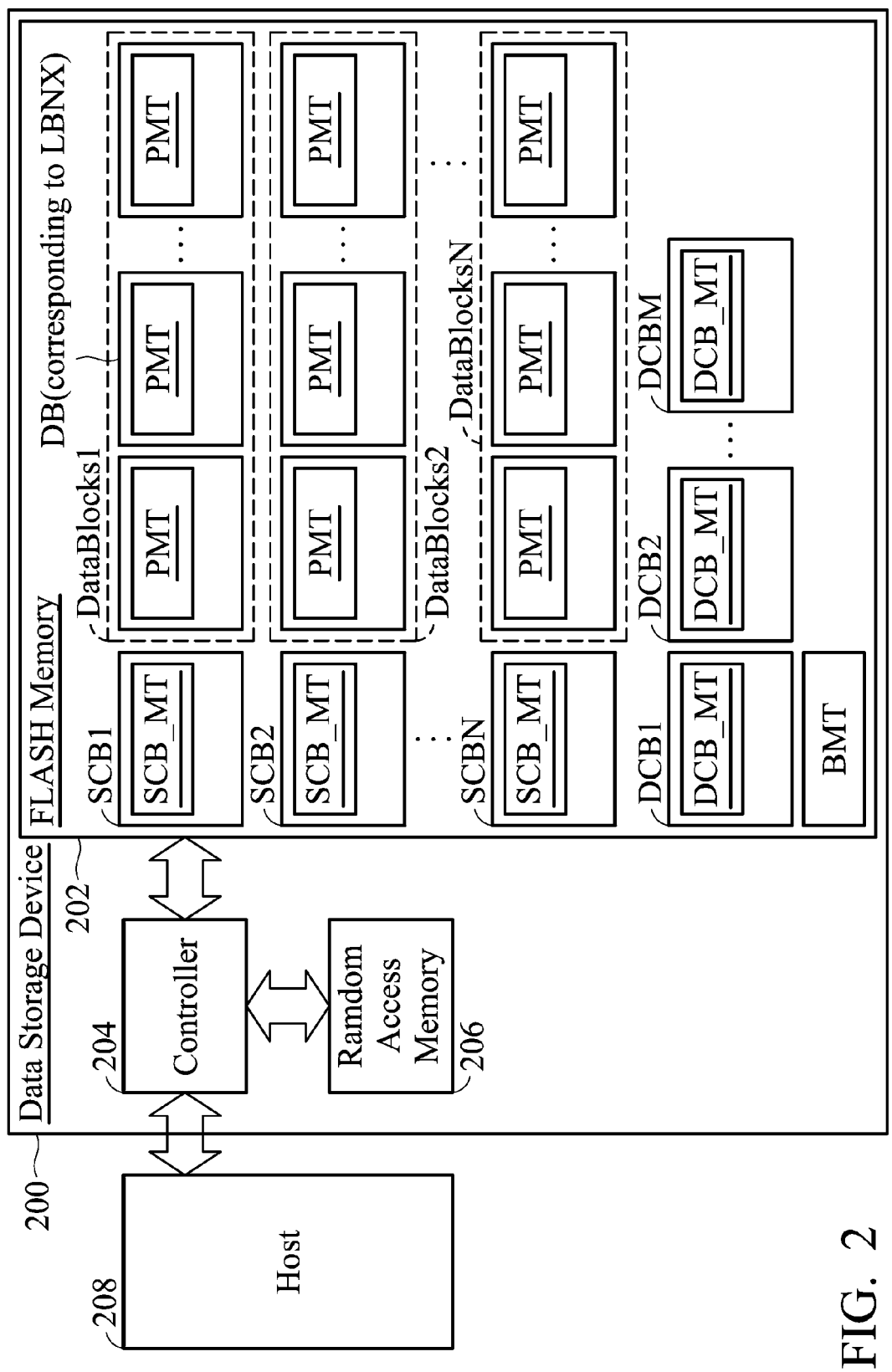
FIG. 2 depicts a data storage device 200 in accordance with an exemplary embodiment of the invention.

FIG. 2 depicts a data storage device 200 in accordance with an exemplary embodiment of the invention, which comprises a FLASH memory 202 and a controller 204 and may further include a random access memory (RAM) 206 coupled to the controller 204. The data storage device 200 may be coupled to a host 208 to operate according to the commands issued from the host 208.

The FLASH memory 202 provides a plurality of groups of data blocks (e.g., a first data block group DataBlocks1, a second data block group DataBlocks2 and so on to an Nth data block group DataBlocksN), a plurality of shared cache blocks SCB1, SCB2 ... SCBN, and a plurality of dedicated cache blocks DCB1, DCB2 ... DCBM.

The different groups of data blocks DataBlocks1 to DataBlocksN are allocated to different groups of logical addresses. In an exemplary embodiment, each data block group corresponds to a plurality of logical blocks, where each logical block is formed by a series of consecutive logical addresses at the host 208. In one data block group, the data blocks may correspond to logical blocks one by one, which is not intended to be limited thereto. In another exemplary embodiment, it is possible to allocate multiple data blocks to correspond to a single logical block.

In an exemplary embodiment, a modulus calculation (%) may be performed on a logical block number (LBN) of each logical block and thereby the data blocks in the FLASH memory 202 are divided into groups. For example, to divide all data blocks into four groups, a modulus calculation "%4" is performed repeatedly. The data blocks allocated to the logical blocks whose LBNs are with zero modulus (LBN %4=0) are classified into a first data block group DataBlocks1, i.e., the first data block group DataBlocks1 corresponds to logical blocks whose LBNs are 0, 4, 8, 12 and so forth. The data blocks allocated to the logical blocks whose LBNs are with modulus '1' (i.e., LBN %4=1) are classified into a second data block group DataBlocks2, i.e., the second data block group DataBlocks2 corresponds to logical blocks whose LBNs are 1, 5, 9, 13 and so forth. The data blocks allocated to the logical blocks whose LBNs are with modulus '2' (i.e., LBN %4=2) are classified into a third data block group DataBlocks3, i.e., the third data block group DataBlocks3 corresponds to logical blocks whose LBNs are 2, 6, 10, 14 and so forth. The data blocks allocated to the logical blocks whose LBNs are with modulus '3' (i.e., LBN %4=3) are classified into a fourth data block group DataBlocks4, i.e., the fourth data block group DataBlocks4 corresponds to logical blocks whose LBNs are 3, 7, 11, 15 and so forth. By the modulus calculation on the LBNs, hot data are spread over different groups. No particular group of data blocks is excessively utilized. Note that this is not intended to limit the data block classification by the modulus calculation on the LBNs. Any data block classification based on the logical addresses of the different data blocks may be utilized in the disclosure. In another exemplary embodiment, data blocks of the same group may correspond to a series of consecutive LBNs. For example, the first data block group DataBlocks1 may include data blocks corresponding to consecutive LBNs, 0, 1, 2, 3 ... K.

Each shared cache block (SCB) is shared by data blocks of a group, as write data cache for the exhausted data blocks of the group. Referring to FIG. 2, a shared cache block SCB1 is shared by the first data block group DataBlocks1, a shared cache block SCB2 is shared by the second data block group DataBlocks2, and so on, a shared cache block SCBN is shared by the Nth data block group DataBlocksN. As shown in FIG. 2, a data block DB corresponding to a logical block LBNX and classified into the first data block group DataBlocks1 is discussed. Once the data block DB is exhausted, the subsequent write data of the logical block LBNX is stored into the shared cache block SCB1. Note that more than on shared cache block may be allocated to be shared by one group of data blocks. In another exemplary embodiment, one SCB is shared by multiple groups of data blocks.

The dedicated cache blocks DCB1 to DCBM are allocated to store hot data. Each dedicated cache block (DCB) corresponds to one hot logical block. Referring to the exemplary embodiment shown in FIG. 2, M dedicated cache blocks numbered from DCB1 to DCBM are operative to store hot data of M hot logical blocks.

The controller 204 is coupled to the FLASH memory 202 to control the read and write of the FLASH memory 202. When it is determined that write data is issued to be written into a hot logical block, the controller 204 caches the write data into the dedicated cache block corresponding to the hot logical block (i.e., stored into one DCB among DCB1 to DCBM). When it is determined that the write data corresponds to an exhausted data block, the controller 204 caches the write data into a shared cache block shared by the group of data blocks having the exhausted data block.

In this paragraph, the method to identify hot logical blocks is discussed. In an exemplary embodiment, the controller 204 may count the number of write operations performed on each logical block. A logical block which has been written more frequently than a threshold number is regarded as a hot logical block and the data issued to be written into the hot logical block has to be cached into a dedicated cache block selected from DCB1 to DCBM. The write number of each logical block may be recorded by the RAM 206. In another exemplary embodiment, the controller 204 gathers logical block statistics over the shared cache blocks SCB1 to SCBN. A logical block which appears in an SCB more frequently than a threshold number should be regarded as a hot logical block and has to be cached into a dedicated cache block selected from DCB1 to DCBM.

Further, to record the mapping between the physical and logical addresses for the data block groups DataBlocks1 to DataBlocksN, the shared cache block SCB1 to SCBN and the dedicated cache blocks DCB1 to DCBM, the controller 204 may further store a data-block mapping table DMT (including the BMT and the PMTs), a plurality of shared cache-block mapping tables SCB_MTs and a plurality of dedicated cache-block mapping tables DCB_MTs in the FLASH memory 202. The controller 204 may load the mapping tables into the RAM 206 for real-time update of the mapping tables.

Figure 3A:
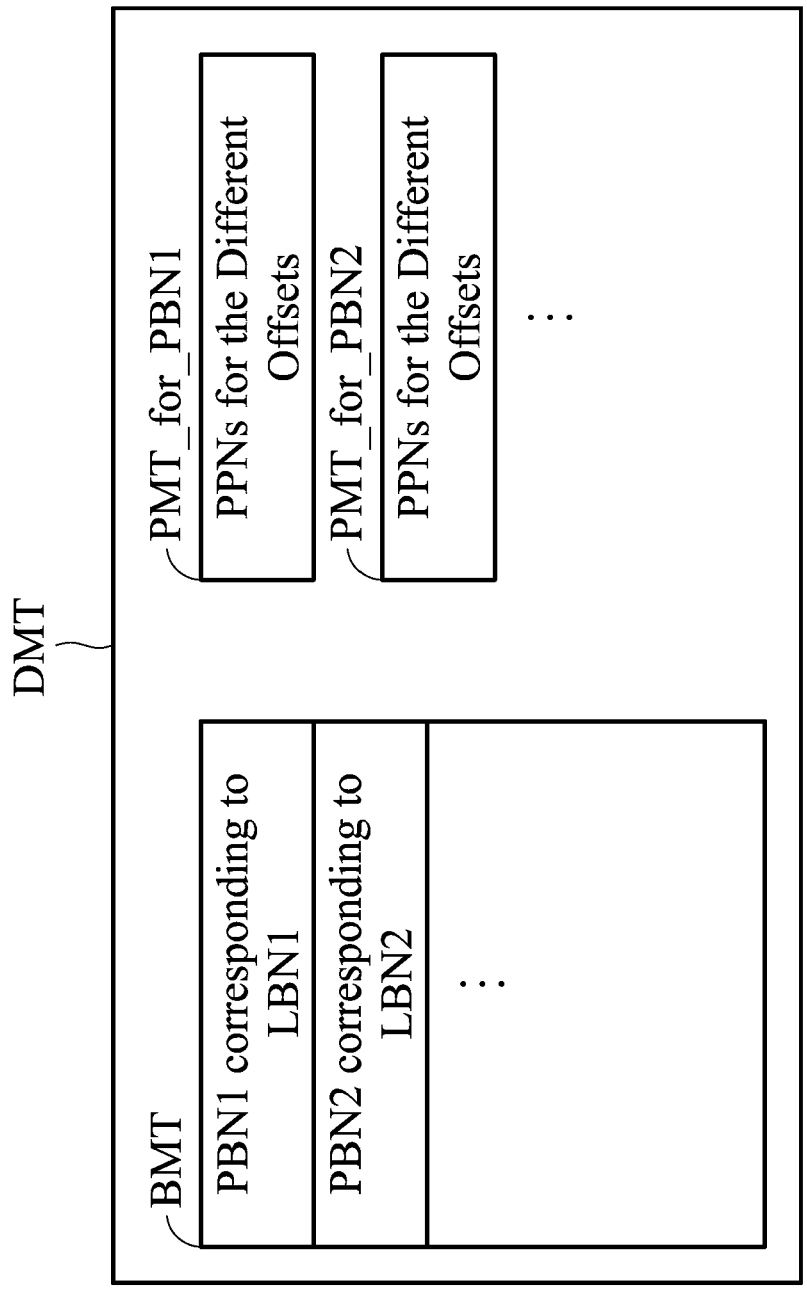
FIG. 3A shows a data-block mapping table DMT.

FIG. 2 shows a block-mapping sub-table BMT and a plurality of page-mapping sub-tables PMTs (wherein each PMT corresponds to a data block and may be stored in the spare space of the data block), which form the data-block mapping table DMT to record the mapping between the physical and logical addresses for the groups of data blocks DataBlocks1 to DataBlocksN. FIG. 3A depicts a data-block mapping table DMT in accordance with an exemplary embodiment of the invention. In the block-mapping sub-table BMT, physical block numbers PBN1, PBN2 and so forth are stored therein to correspond to the different logical block numbers LBN1, LBN2 and so forth, respectively. To trace the storage in the different physical pages of each data block, page-mapping sub-tables PMT_for_PBN1, PMT_for_PBN2 and so forth (i.e., the PMTs shown in FIG. 2) are established. In each page mapping sub-table, the physical page numbers (PPNs) corresponding to the different logical page offsets are recorded. A logical page offset is provided to be combined with the logical block number (LBN) to evaluate a logical page number (LPN), where the logical page number (LPN) may be evaluated from a logical address (LBA). For example, the logical address (LBA) issued from the host may include information about the logical block number (LBN), the logical page offset (offset) and so on. According to the logical block number (LBN), the block-mapping sub-table BMT is referred to and a physical block number (PBN) corresponding thereto is obtained. According to the physical block number (PBN), the page-mapping sub-table corresponding thereto (one of PMT_for_PBN1, PMT_for_PBN2 . . . ) is found. According to the logical page offset (offset), the page-mapping sub-table corresponding thereto is referred to and thereby a physical page number (PPN) corresponding to the offset is obtained. In this manner, the physical location of the logical address (LBA) is found. We can know which page of which data block physically corresponds to the logical address (LBA). In another exemplary embodiment, for each physical block number (PBN), the page-mapping sub-table corresponding thereto is established after the data block corresponding to a physical block number is decided. The controller 204 establishes the page-mapping sub-table of the data block by scanning the entire data block corresponding to the physical block number.

Referring to FIG. 2, the shared cache-block mapping tables SCB_MTs are stored in the spare space of the corresponding one of the shared cache blocks SCB1 to SCBN. In each shared cache-block mapping table SCB_MT, the logical page numbers (LPNs) corresponding to the different physical pages of the shared cache block are recorded therein. FIG. 3B depicts the structure of a shared cache-block mapping table SCB_MT, wherein the logical page numbers (LPNs) corresponding to the different physical pages of a shared cache block are shown. In another exemplary embodiment and the logical block's occurrence in the SCB is monitored (e.g. the number of occurrence may be recorded) for hot logical block identification.

Referring to FIG. 2, the spare space of the dedicated cache blocks DCB1 to DCBM may be further utilized to store the dedicated cache-block mapping tables DCB_MTs corresponding thereto. In each dedicated cache-block mapping table DCB_MT, the logical page numbers (LPNs) corresponding to the different physical pages of the dedicated cache block are recorded therein. FIG. 3C depicts the structure of a dedicated cache-block mapping table DCB_MT, wherein the logical page numbers (LPNs) corresponding to the different physical pages of a dedicated cache block are shown.

Because one logical address may be rewritten many times, according to a shared cache-block mapping table SBC_MT of FIG. 3B or a dedicated cache-block mapping table DBC_MT of FIG. 3C, different physical pages may map to an identical logical page number LPN. The valid mapping information is the latest updated one. Further, in another exemplary embodiment, the shared cache-block mapping tables SBC_MTs or the dedicated cache-block mapping tables DBC_MTs may be rebuilt by the controller 204 which scans the corresponding shared cache blocks and the corresponding dedicated cache blocks in the FLASH memory.

The controller 204 may operate according the read/write commands issued from the host 208 as those discussed in the following paragraphs.

Figure 4:
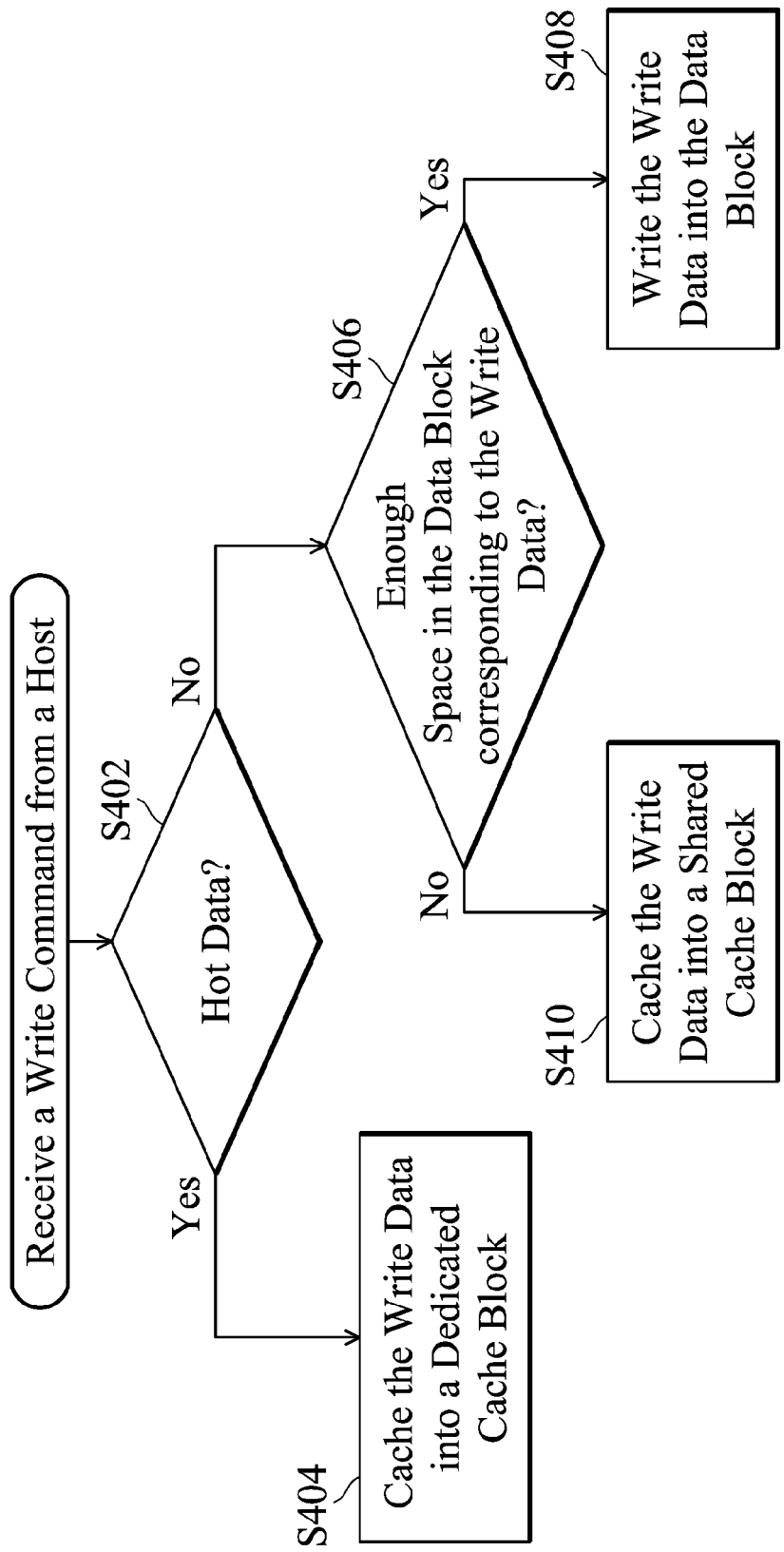
FIG. 4 is a flowchart depicting operations in response to a write command.

When the host 208 issues a write command, the controller 204 may operate according to the flowchart shown in FIG. 4. In step S402, it is determined whether the logical address of the write data is located in a hot logical block. When the logical address is in a hot logical block, step S404 is performed, in which the write data is cached into a dedicated cache block (one of DCB1 to DCBM). Note that when one dedicated cache block has been allocated to the logical block of the issued logical address in the prior write operations, the write data should be written into the same dedicated cache block. When there is no DCB corresponding to the logical block of the issued logical address, a spare DCB is allocated to the logical block of the issued logical address for storage of the write data. When it is determined that the written data is not issued to be written into a hot logical block, step S406 is performed to determine whether the data block corresponding to the logical address has sufficient space for the write data. When the space remaining is sufficient, step S408 is performed, and the write data is written into the data block. When it is determined in step S406 that the data block corresponding to the write data has been exhausted, step S410 may be performed, to cache the write data by a shared cache block.

Figure 5:
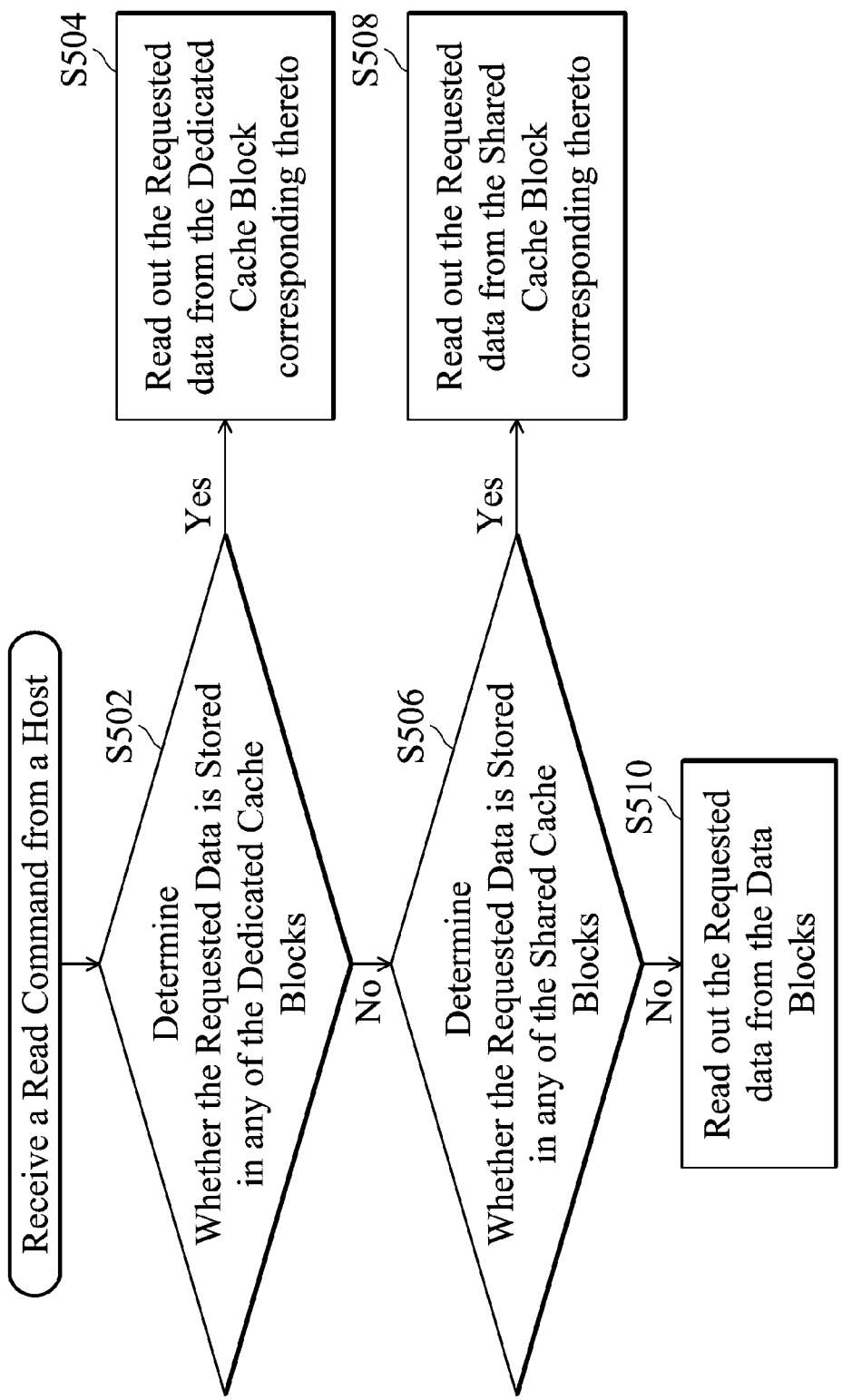
FIG. 5 is a flowchart depicting operations in response to a read command.

When a read command is issued from the host 208, the controller 204 may operate according to the flowchart of FIG. 5. In step S502, based on the logical address (e.g., based on the logical page number LPN therein) of the read command, it is determined whether the read data is stored in any of the dedicated cache blocks DCB1 to DCBM. In an exemplary embodiment, it is further determined in step S502 whether the logical address is located in a hot logical block. If yes, the dedicated cache-block mapping table (e.g., DCB_MT of FIG. 3C) corresponding to the hot logical block is searched according to the logical address. Because the physical page number (PPN) is used as the index of the dedicated cache-block mapping table DCB_MT to find the logical page number LPN corresponding thereto, the dedicated cache-block mapping table DCB_MT is searched in a reverse lookup to find the physical page number (PPN) corresponding to a specific logical page number (LPN). For example, a reverse search algorithm is performed to search the table DCB_MT, and a physical page number (PPN) is found according to the LPN of the logical address. When the same LPN corresponds to multiple physical pages in a DCB_MT, only the greatest physical page number (PPN) is valid. In step S504, data is read out from the dedicated cache block DCB according to the physical page number PPN obtained by searching the DCB_MT. In another exemplary embodiment, all dedicated cache-block mapping tables (DCB_MTs of FIG. 2) are searched according to the logical page number (LPN) included in the read command, and thereby it is determined whether the requested data is stored in a physical page of any of the dedicated cache blocks DCB1 to DCBM. When the requested logical page number LPN is found in one of the dedicated cache-block mapping tables DCB_MTs, according to the dedicated cache block number and the physical page number, data is read out from the dedicated cache block corresponding thereto in step S504. When it is determined in step S502 that the data indicated requested by the logical address included in the read command is not stored in any dedicated cache block, step S506 is performed to determine whether the requested data is in any of the shared cache blocks SCB1 to SCBN. In an exemplary embodiment, a determination is performed first in step S506 based on the logical block number (LBN) of the requested logical address. For example, a Hash operation is performed on the logical block number (LBN) to determine which one of the shared cache blocks SCB1 to SCBN corresponds to the requested logical address. The Hash operation is discussed below. When the data blocks are grouped based on the Hash operation, too many hot blocks sharing the same shared cache block is avoided. Thus, a shared cache block is prevented from being filled up quickly. In an exemplary embodiment, a shared cache block SCB0 is shared by the blocks corresponding to logical block numbers (LBNs) 0, 4, 8, 12 and so forth, a shared cache block SCB1 is shared by the blocks corresponding to logical block numbers (LBNs) 1, 5, 9, 13 and so forth, a shared cache block SCB2 is shared by the blocks corresponding to logical block numbers (LBNs) 2, 6, 10, 14 and so forth, and, a shared cache block SCB3 is shared by the blocks corresponding to logical block numbers (LBNs) 3, 7, 11, 15 and so forth. Thus, the shared cache block corresponding to a requested logical address may be found according to the logical block number (LBN). Note that, similar to the dedicated cache-block mapping table DCB_MT, in a shared cache-block mapping table SCB_MT, the physical page number (PPN) is used as the index of SCB_MT to find the logical page number LPN corresponding thereto. Thus, when finding a physical page number (PPN) corresponding to a specific logical page number (LPN), the table SCB_MT is checked in a reverse lookup (similar to the look up method for a dedicated cache-block mapping table DCB_MT, not repeated herein). In step S508, data is read out from a shared cache block SCB according to the physical page number PPN obtained by searching the SCB_MT. In another exemplary embodiment, all shared cache-block mapping tables (SCBs) are scanned according to the logical page number (LPN) of the requested logical address, to determine whether the requested data is stored in a physical page of any of the shared cache blocks SCB1 to SCBN. When the requested logical page number (LPN) is found recorded in one of the shared cache-block mapping tables, a shared cache block index number and a physical page index number are obtained therein, and thereby the requested data is read out from the shared cache block according to the shared cache block index number and the physical page index number. When it is determined in step S506 that the requested data of the logical address included in the read command is not stored in any of the shared cache blocks, step S510 is performed to search a data-block mapping table (formed by the BMT and the PMTs of FIG. 2) to obtain the requested data from one of the data blocks.

By the data storage devices with FLASH memory and the operating methods of the disclosure, the write data issued from a host is cached in the FLASH memory. The FLASH memory contains old data and new data, and preferably two different data cache techniques are available. Using the first technique, storage blocks are dynamically allocated as dedicated cache blocks to store the hot data frequently re-written. The hot data are quite gathered together, and thereby the hit rate that the host accesses the hot data is enhanced. The number of read/write operations on the data storage device per second (Input/Output Operations Per Second, IOPS) as well as the valid data throughput of successive write operations are increased. Using the second technique, one shared cache block is shared by multiple data blocks. When a data block is filled up, the subsequent data corresponding thereto is written into the shared cache block shared by the group of data blocks having the filled data block. The design of the shared cache blocks facilitates the valid data collection operation and storage block space release operation without affecting the FLASH memory performance. The disclosure is preferably implemented by a controller without a random access memory (RAM) contained therein as a data cache, or, in other exemplary embodiments, just a small-sized RAM is available. However, this is not intended to limit the disclosure. In another exemplary embodiment, the FLASH memory may be equipped with a RAM of large capacity.

The valid data collection operation and the block space release operation are described below.

Figure 6A:
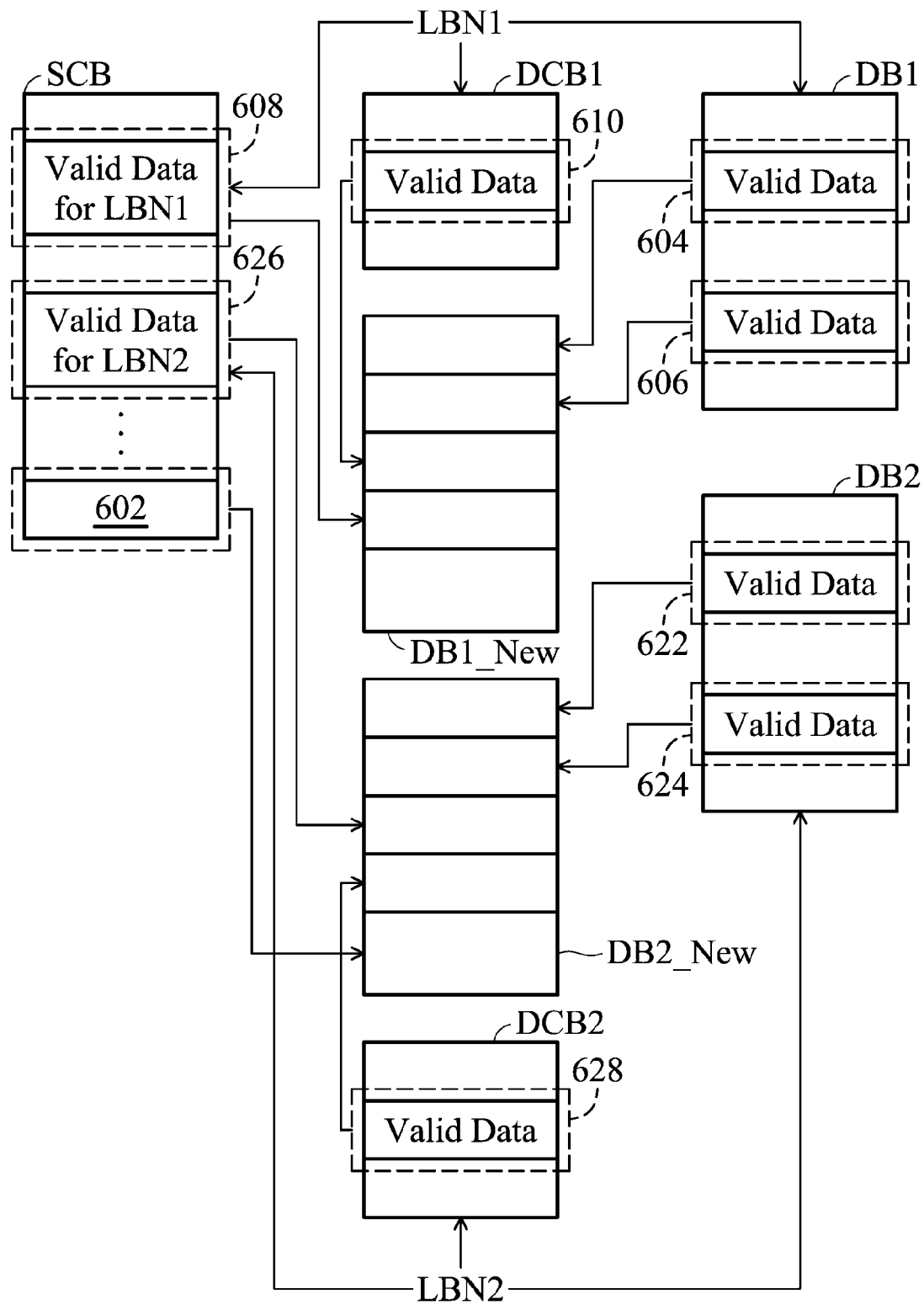
FIG. 6A depicts an exemplary embodiment of the invention, wherein a valid data collection operation and a block space release operation are performed when writing data to the last physical page of the shared cache block SCB.

According to an exemplary embodiment of the invention, FIG. 6A depicts how a valid data collection operation and a block space release operation are performed when a shared cache block is filled up. The controller 204 may perform the valid data collection operation and the block space release operation when writing data to the last physical page of the shared cache block SCB (like, writing data 602). The controller 204 scans for all logical blocks related to the data stored in the shared cache block SCB (e.g. including LBN1 and LBN2), and collects valid data from the shared cache block SCB and from the data blocks DB1 and DB2 and the dedicated cache blocks DCB1 and DCB2 (wherein, DB1 and DCB1 correspond to the logical block number LBN1, and DB2 and DCB2 correspond to the logical block number LBN2). For the logical block number LBN1, the controller 204 allocates a data block DB1_New to collect the valid data 604 and 606 obtained from the data block DB1, the valid data 608 obtained from the shared cache block SCB, and the valid data 610 obtained from the dedicated cache block DCB1. For the logical block number LBN2, the controller 204 allocates a data block DB2_New to collect the valid data 622 and 624 obtained from the data block DB2, the valid data 626 and 602 (supposing that the data 602 written to the last page of SCB is also belonging to LBN2) obtained from the shared cache block SCB, and the valid data 628 obtained from the dedicated cache block DCB2. In this manner, only invalid data remains in the shared cache block SCB. The shared cache block SCB, thereby, may be entirely erased and the space is released to be allocated as another shared cache block or a data block or a dedicated cache block.

Figure 6B:
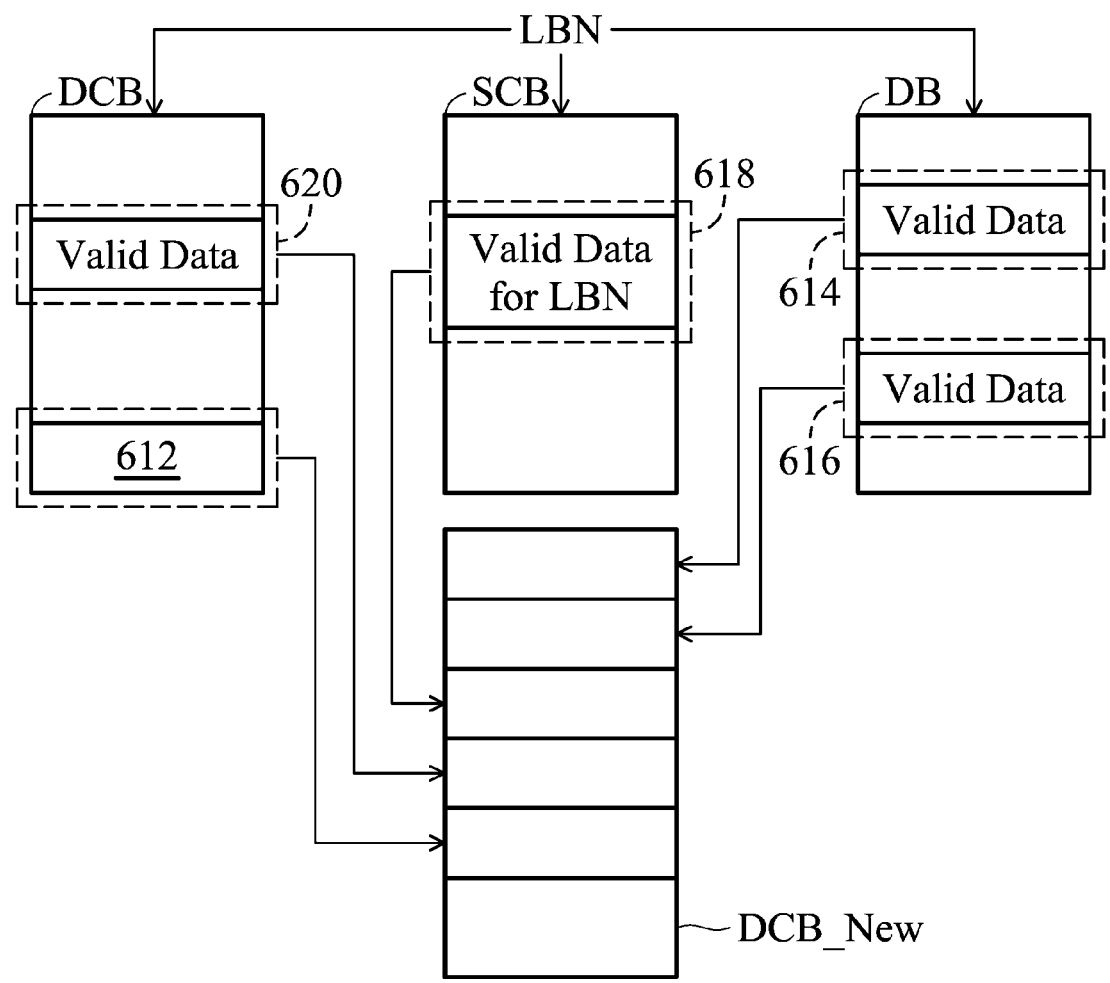
FIG. 6B depicts an exemplary embodiment of the invention, wherein a valid data collection operation and a block space release operation are performed when writing data to the last physical page of the dedicated cache block DCB.

According to another exemplary embodiment of the invention, FIG. 6B depicts how a valid data collection operation and a block space release operation are performed when a dedicated cache block DCB is filled up. The controller 204 may perform the valid data collection operation and the block space release operation when writing data to the last physical page of the dedicated cache block DCB (like, writing data 612). Based on the logical block number LBN corresponding to the dedicated cache block DCB, the controller 204 finds a data block DB and a shared cache block SCB corresponding to the LBN. The controller 204 may allocate a new dedicated cache block DCB_New to collect the valid data 614 and 616 from the data block DB, the valid data 618 from the shared cache block SCB with respect to the same logical block number LBN, and the valid data 620 and 612 from the dedicated cache block DCB. Therefore, only invalid data remain in the old dedicated cache block DCB. The old dedicated cache block DCB may be erased to free space to be allocated for data storage in the future. The dedicated cache block DCB_New replaces the role of the dedicated cache block DCB, to cache data exclusively corresponding to the logical block number LBN. In another exemplary embodiment, a new data block DB_New (not shown) rather than the new dedicated cache block DCB_New is allocated to collect the valid data 612~620. The new data block DB_New replaces the role of the original dedicated cache block DCB.

In some exemplary embodiments, the valid data collection operation and the block space release operation discussed above are performed when the number of the dedicated cache blocks is less than a specific number. The controller 204 may perform the valid data collection operation on dedicated cache bocks that are not free. It is not intended to limit the invention to collecting valid data by a free dedicated cache block. A newly-allocated free data block may be utilized to collect the valid data. After the valid data collection operation, the dedicated cache data only containing invalid data may be erased to free space and may be allocated as a free dedicated cache data or a data block or a shared cache block.

The controller 204 has a plurality of embodiments. For example, the controller 204 can be achieved by a micro control unit (MCU) executing a firmware and the operating method of the controller 204 to the FLASH memory 202 is also within the scope of the invention.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
 a FLASH memory, comprising a plurality of groups of data blocks and comprising a plurality of shared cache blocks and a plurality of dedicated cache blocks, wherein:
  each shared cache block is shared by one group of data blocks; and
  each dedicated cache block corresponds to one hot logical block; and
 a controller, coupled to the FLASH memory, wherein:
  when a logical address of write data is determined to belong to a hot logical block, the controller caches the write data into the dedicated cache block corresponding to the hot logical block; and
  when the write data corresponds to a filled-up data block, the controller caches the write data into the shared cache block shared by the group of data blocks having the filled-up data block.

2. The data storage device as claimed in claim 1, wherein in each group of data blocks, each data block corresponds to a logical block.

3. The data storage device as claimed in claim 1, wherein the controller further counts write operations performed on a logical block, and determines the logical block to be said hot logical block when the logical block has been written more frequently than a threshold number of times.

4. The data storage device as claimed in claim 1, wherein, the controller further monitors the shared cache blocks, and determines the logical address to belong to said hot logical block when the logical address has been stored into the shared cache blocks more frequently than a threshold number of times.

5. The data storage device as claimed in claim 1, wherein the controller further maintains a data-block mapping table, a plurality of shared cache-block mapping tables and a plurality of dedicated cache-block mapping tables in the FLASH memory to record the mapping between the logical and physical addresses respectively for the groups of data blocks, the shared cache blocks, and the dedicated cache blocks.

6. The data storage device as claimed in claim 5, wherein the data-block mapping table comprises:
 a block-mapping sub-table, indicating the data block allocated to each logical block; and
 a plurality of page-mapping sub-tables for the different data blocks, wherein each page-mapping sub-table is stored in a spare space of the data block corresponding thereto and is recorded with physical page numbers corresponding to different logical page offsets.

7. The data storage device as claimed in claim 5, wherein:
 for each shared cache block, the shared cache-block mapping table corresponding thereto is recorded with logical page numbers corresponding to different physical pages thereof; and
 for each dedicated cache block, the dedicated cache-block mapping table corresponding thereto is recorded with logical page numbers corresponding to different physical pages thereof.

8. The data storage device as claimed in claim 1, wherein:
 based on a logical address of a read command issued from a host, the controller determines whether data requested by the read command is stored in any of the dedicated cache blocks;
 when determining that the requested data is not stored in any of the dedicated cache blocks, the controller further determines whether the requested data is stored in any of the shared cache blocks; and
 when determining that the requested data is not stored in any of the shared cache blocks, the controller reads out the requested data from the data blocks.

9. The data storage device as claimed in claim 1, wherein: when one of the shared cache blocks is filled up, the controller finds the logical blocks involved in the filled-up shared cache block and performs a valid data collection operation on the filled-up shared cache block as well as the data blocks and the dedicated cache blocks corresponding to the logical blocks involved in the filled-up shared cache block.

10. The data storage device as claimed in claim 1, wherein: when less than a specific number of dedicated cache blocks are free, the controller selects a dedicated cache block that has most recently been written into or selects a dedicated cache block that is just filled up, and finds the shared cache block and the data block corresponding to a logical block of the selected dedicated cache block, and allocates a free data block to collect valid data of the logical block from the selected dedicated cache block, the shared cache block and the data block corresponding thereto.

11. An operating method for a data storage device, comprising:
 allocating a FLASH memory of the data storage device to provide a plurality of groups of data blocks, a plurality of shared cache blocks and a plurality of dedicated cache blocks, wherein each shared cache block is shared by one group of data blocks, and each dedicated cache block corresponds to one hot logical block;
 when a logical address of write data is determined to belong to a hot logical block, the write data is cached into the dedicated cache block corresponding to the hot logical block; and
 when the logical address does not belong to a hot logical block and data block corresponding to the logical address is filled up, the write data is cached into the shared cache block shared by the group of data blocks having the filled-up data block.

12. The operating method as claimed in claim 11, wherein in each group of data blocks, each data block corresponds to a logical block.

13. The operating method as claimed in claim 11, further comprising:
    counting write operations performed on a logical block; and
    determining the logical block to be said hot logical block when the logical block has been written more frequently than a threshold number of times.

14. The operating method as claimed in claim 11, further comprising:
    monitoring the shared cache blocks, and determining the logical address to belong to said hot logical block when the logical address has been stored into the shared cache blocks more frequently than a threshold number of times.

15. The operating method as claimed in claim 11, further comprising:
    maintaining a data-block mapping table, a plurality of shared cache-block mapping tables and a plurality of dedicated cache-block mapping tables in the FLASH memory to record the mapping between the logical and physical addresses respectively for the groups of data blocks, the shared cache blocks and the dedicated cache blocks.

16. The operating method as claimed in claim 15, wherein the data-block mapping table comprises:
    a block-mapping sub-table, indicating the data block allocated to each logical block; and
    a plurality of page-mapping sub-tables for the different data blocks, wherein each page-mapping sub-table is stored in a spare space of the data block corresponding thereto and is recorded with physical page numbers corresponding to different logical page offsets.

17. The operating method as claimed in claim 15, wherein:
    for each shared cache block, the shared cache-block mapping table corresponding thereto is recorded with logical page numbers corresponding to different physical pages thereof; and
    for each dedicated cache block, the dedicated cache-block mapping table corresponding thereto is recorded with logical page numbers corresponding to different physical pages thereof.

18. The operating method as claimed in claim 11, further comprising:
    based on a logical address of a read command issued from the host, determining whether data requested by the read command is stored in any of the dedicated cache blocks;
    when the requested data is not stored in any of the dedicated cache blocks, further determining whether the requested data is stored in any of the shared cache blocks; and
    when the requested data is not stored in any of the shared cache blocks, reading out the requested data from the data blocks.

19. The operating method as claimed in claim 11, further comprising:
    when one of the shared cache blocks is filled up, finding logical blocks involved in the filled-up shared cache block; and
    performing a valid data collection operation on the filled-up shared cache block as well as the data blocks and the dedicated cache blocks corresponding to the logical blocks involved in the filled-up shared cache block.

20. The operating method as claimed in claim 11, further comprising the following steps when less than a specific number of dedicated cache blocks are free:
    selecting a dedicated cache block that has most recently been written into or selecting a dedicated cache block that is just filled up;
    finding the shared cache block and the data block corresponding to a logical block of the selected dedicated cache block; and
    allocating a free data block to collect valid data of the logical block from the selected dedicated cache block, the shared cache block and the data block corresponding thereto.

* * * * *